(12) United States Patent
Tamamoto et al.

(10) Patent No.: US 7,337,889 B2
(45) Date of Patent: Mar. 4, 2008

(54) AUTOMATED TELLER MACHINE

(75) Inventors: Junichi Tamamoto, Chiyoda (JP); Yoshiyuki Omori, Owariasahi (JP); Mizuki Kaii, Nagoya (JP); Kazushi Yoshida, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 1489 days.

(21) Appl. No.: 09/923,965

(22) Filed: Aug. 8, 2001

(65) Prior Publication Data

US 2002/0049674 A1  Apr. 25, 2002

(30) Foreign Application Priority Data

Oct. 20, 2000 (JP) ............................. 2000-326996
Jan. 19, 2001 (JP) ............................. 2001-010984

(51) Int. Cl.
*G07D 7/00* (2006.01)
*G07D 7/18* (2006.01)

(52) U.S. Cl. ........................................ 194/302; 73/800

(58) Field of Classification Search ........ 194/205–209, 194/328; 101/93.07; 226/52, 53, 184
See application file for complete search history.

(56) References Cited

U.S. PATENT DOCUMENTS 4,519,249 A    5/1985   Hunt
4,723,072 A    2/1988   Naruse
5,761,089 A *  6/1998   McInerny ................... 702/128
5,943,631 A    8/1999   Kayani
5,955,741 A *  9/1999   Kayani ................. 250/559.11
6,040,584 A    3/2000   Liu et al.

FOREIGN PATENT DOCUMENTS

| EP | 0 892 371 | 1/1999 |
|----|-----------|--------|
| EP | 1 011 079 | 6/2000 |
| JP | 3-74431   | 11/1985 |
| JP | 1-256435  | 10/1989 |
| JP | 8-194859  | 7/1996 |
| JP | 10-134225 | 5/1998 |
| JP | 10-213581 | 8/1998 |

* cited by examiner

*Primary Examiner*—Patrick Mackey
*Assistant Examiner*—Mark J. Beauchaine
(74) *Attorney, Agent, or Firm*—Antonelli, Terry, Stout & Kraus, LLP.

(57) ABSTRACT

An automated teller machine for handling a paper money, has a paper money path for transferring the paper money along a predetermined direction, and a detector for measuring a condition of the paper money, comprising a light beam emitter for emitting a light beam toward the paper money, and a light beam receiver for receiving at least one of the light beam reflected by the paper money and the light beam passing through the paper money.

17 Claims, 13 Drawing Sheets

RAPER MONEY THICKNESS DIRECTION

AUTOMATED TELLER MACHINE

BACKGROUND OF THE INVENTION AND RELATED ART STATEMENT

The present invention relates to an automated teller machine for handling a paper money.

JP-B2-3-74431 discloses an automated teller machine in which whether or not a paper money is new or old is judged on the basis of a quantity of light passing through the paper money.

JP-A-10-134225 discloses an automated teller machine in which a paper money treating velocity is changed in accordance with a kind of the paper money and a wearing degree of the paper money.

JP-A-10-213581 discloses a method for measuring a rigidity of a paper money by measuring a reaction force of the paper money while being deformed.

JP-A-1-256435 and JP-A-8-194859 disclose an automated teller machine in which a skewed paper money, a misaligned paper money and a worn paper money is returned to a gate way of the automated teller machine.

OBJECT AND SUMMARY OF THE INVENTION

An object of the present invention is to provide an automated teller machine for handling a paper money, in which a cut in the paper money and/or an excessively decreased rigidity of the paper money is securely detected.

An automated teller machine for handling a paper money according to the present invention, comprises a paper money path for transferring the paper money along a predetermined direction, and a detector for measuring a condition of the paper money, comprising a light beam emitter for emitting a light beam toward the paper money, and a light beam receiver for receiving at least one of the light beam reflected by the paper money and the light beam passing through the paper money.

Since the detector measures a condition of the paper money, by a light beam emitter for emitting a light beam toward the paper money, and a light beam receiver for receiving at least one of the light beam reflected by the paper money and the light beam passing through the paper money, the condition is optically detected on the basis of the at least one of the light beam reflected by the paper money and the light beam passing through the paper money.

If the automated teller machine further comprises a paper money deforming device for applying to the paper money at least one of a tension in at least one of a first direction parallel to the predetermined direction and perpendicular to a paper money thickness direction and a second direction perpendicular to the predetermined direction and the paper money thickness direction, a compression force in at least one of the first and second directions, and a pair of forces away from each other in at least one of the first and second directions while directions of the forces are opposite to each other in the paper money thickness direction, so that at least one of a width of a clearance in the paper money extending from an edge of the paper money and a width of a clearance in the paper money prevented from extending from the edge of the paper money is expanded by the paper money deforming device, the clearance or cut in the paper money is securely detected. The at least one of the tension, the compression force and the pair of forces may be applied to the paper money at at least one of upstream and downstream sides of the detector in the predetermined direction. If the paper money deforming device includes at least one roller rotatable on an axis parallel to the second direction and a rotatable supplemental roller, the roller includes a tapered surface adapted to contact the money paper in the second direction and to be pressed against a peripheral surface of the supplemental roller, and the tapered surface includes elastomer, the at least one of the tension and the compression force is easily generated without an inclination of a rotational axis of the roller with respect to a rotational axis of a paper money feeding roller on an imaginary plane perpendicular to the paper money thickness direction. If the roller includes a pair of the tapered surfaces, and the tapered surfaces is directed to the same direction, a rotational moment is restrained from being applied to the paper money.

If the detector detects an existence of at least one of a clearance in the paper money extending from an edge of the paper money and a clearance in the paper money prevented from extending from the edge of the paper money as the condition of the paper money when a luminous degree of the at least one of the light beam reflected by the paper money and the light beam passing through the paper money detected by the light beam receiver is more than a predetermined value, the existence of the clearance or cut in the paper money is detected securely. The luminous degree may be an average luminous intensity, a maximum luminous intensity or a total amount of luminous flux in the at least one of the light beam reflected by the paper money and the light beam passing through the paper money, received by the light beam receiver.

If the light beam receiver detects at least one of a luminous degree of the at least one of the light beam reflected by the paper money and the light beam passing through the paper money received by the light beam receiver, and a contrast in the at least one of the light beam reflected by the paper money and the light beam passing through the paper money received by the light beam receiver so that a rigidity of the paper money as the condition of the paper money is estimated on the basis of the at least one of the detected luminous degree and the detected contrast, the rigidity of the paper money is measured optically. The luminous degree may be an average luminous intensity, a maximum luminous intensity or a total amount of luminous flux in the at least one of the light beam reflected by the paper money and the light beam passing through the paper money, received by the light beam receiver. The contrast may be a standard deviation of luminous intensity or a difference between a maximum luminous intensity and a minimum luminous intensity in the at least one of the light beam reflected by the paper money and the light beam passing through the paper money, received by the light beam receiver.

If the light beam receiver detects at least one of a luminous degree of the at least one of the light beam reflected by the paper money and the light beam passing through the paper money received by the light beam receiver, and a contrast in the at least one of the light beam reflected by the paper money and the light beam passing through the paper money received by the light beam receiver so that a rigidity of the paper money as the condition of the paper money is estimated on the basis of the at least one of the detected luminous degree and the detected contrast, when the luminous degree of the at least one of the light beam reflected by the paper money and the light beam passing through the paper money detected by the light beam receiver is not more than a predetermined value, the rigidity of the paper money is measured optically while an optical degree corresponding to the clearance or cut in the paper money is prevented from being introduced into the estimation or calculation of the rigidity. The luminous degree may be an average luminous intensity, a maximum luminous intensity or a total amount of luminous flux in the at least one of the light beam reflected by the paper money and the light beam passing through the paper money, received by the light beam receiver. The contrast may be a standard deviation of luminous intensity or a difference between a maximum luminous intensity and a minimum luminous intensity in the at least one of the light beam reflected by the paper money and the light beam passing through the paper money, received by the light beam receiver.

The light beam receiver may detect at least one of the luminous degree of the at least one of the light beam reflected by both non-printed (substantially white or not-ink-including) area and printed (not-substantially-white or ink-including) area of the paper money and the light beam passing through the both non-printed area and printed area of the paper money received by the light beam receiver, and a contrast in the at least one of the light beam reflected by the both non-printed area and printed area of the paper money and the light beam passing through the both non-printed area and printed area of the paper money, received by the light beam receiver. The detector judges the rigidity of the paper money to be less than a predetermined rigidity when the at least one of the luminous degree and the contrast is less than a predetermined value.

The light beam receiver may detect at least one of the luminous degree of the at least one of the light beam reflected by a non-printed area (substantially white or not-ink-including) of the paper money and the light beam passing through the non-printed area of the paper money received by the light beam receiver, and a contrast in the at least one of the light beam reflected by the non-printed area of the paper money and the light beam passing through the non-printed area of the paper money, received by the light beam receiver. The detector judges the rigidity of the paper money is less than a predetermined rigidity when the luminous degree is less than a predetermined value and/or when the contrast is more than a predetermined value.

If the paper money deforming device includes at least one roller rotatable on an axis parallel to the second direction and a rotatable supplemental roller, the roller includes first and second peripheral surfaces adapted to contact the money paper in the second direction and to be pressed against a peripheral surface of the supplemental roller, frictional coefficients of the first and second surfaces with respect to the paper money are different from each other, and the first and second surfaces include elastomer, the at least one of the tension and the compression force is easily generated without an inclination of a rotational axis of the roller with respect to a rotational axis of a paper money feeding roller on an imaginary plane perpendicular to the paper money thickness direction.

DETAILED DESCRIPTION OF PREFERRED EMBODIMENTS

Figure 1:
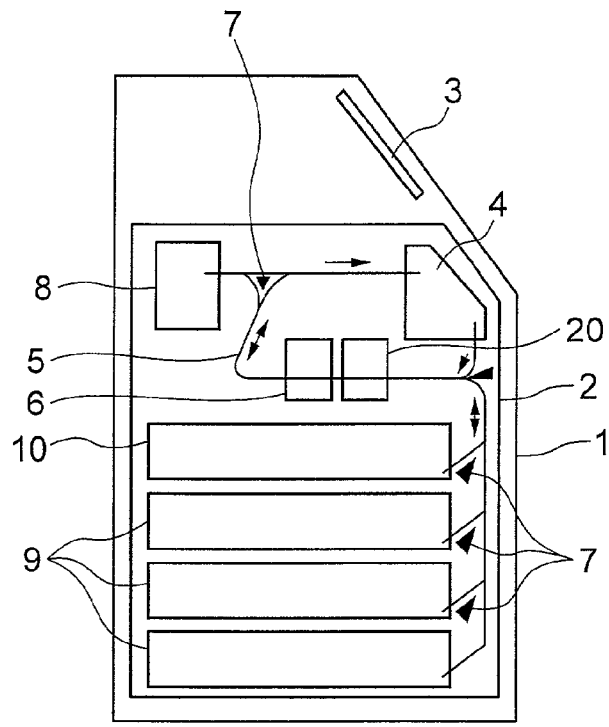
FIG. 1 is a schematic cross sectional view showing an automated teller machine of the invention.

As shown in FIG. 1, an automated teller machine 1 of the present invention has a paper money treating device 2 and an interface device 3. The paper money treating device 2 takes a paper money into the automated teller machine 1 and exposes the paper money thereon to be taken by a person operating the automated teller machine 1. The interface device 3 has a combination of a monitor display and push-buttons, or a touch-panel including the monitor display and touch-switches. The person operating the automated teller machine inputs through the interface device 3 an order of, for example, drawing or depositing the money, and the interface device 3 indicates an operating method of the automated teller machine 1. The automated teller machine 1 may include a card treating device, a passbook treating device and/or a coin treating device.

When the person orders depositing the money on the interface device 3, a shutter of a paper money gateway 4 is opened so that the stacked paper moneys are taken into the automated teller machine 1. Each of the paper moneys is drawn from the paper money gateway 4 by a feeding roller whose outer peripheral surface is formed by elastomer to be fed toward a transfer path 5. The transfer path 5 has, for example, a combination of a belt and rollers to transfer the each of the paper moneys clamped between the belt and rollers rotated respectively. A paper money validator 6 measures a magnetic and/or optical characteristic of the each of the paper moneys to validate whether or not the each of the paper moneys is counterfeit. The counterfeit paper money and an inappropriate paper money whose size is decreased by a tear or the like is returned to the paper money gateway 4 by switching a gate 7. The paper money judged to be appropriate is contained temporarily by a container 8. After an amount of the paper moneys in the paper money gateway 4 calculated by the automated teller machine 1 is confirmed through the interface device 3 by the person operating the automated teller machine 1, the paper moneys are fed to another container 9 through the transfer path 5. If the another container 9 has a plurality of container sections 9 corresponding to respective kinds of paper money, the paper money is guided to a suitable one of the container sections 9 by switching the gate 7.

When the person draws the money from the automated teller machine 1, the person orders drawing the money through the interface device 3. The paper moneys of a required number are fed from the another container 9 to the transfer path 5. When a condition of the paper money is validated by the paper money validator 6 to be inappropriate to be drawn out of the automated teller machine 1, the inappropriate paper money is temporarily contained by the container 8 by switching the gate 7. Only the appropriate paper money is fed to the paper money gateway 4. After the paper moneys of the required number are contained by the paper money gateway 4, the shutter of the paper money gateway 4 is opened so that the paper moneys are taken out of the automated teller machine 1 by the person, and the inappropriate paper B money is fed from the container 8 to a reject container 10.

A high reliability of the automated teller machine 1 is required because it is used in a self-service stand or a shop opened for a whole day. On the other hand, the money paper in a bad condition is generally used in the market. The paper moneys with a low rigidity and/or cut cause easily a jam thereof when feeding or containing them. The jam occurs when the cut in the paper money is caught by a paper money transfer guide, or a buckling of the paper money is caused by a low rigidity of the paper money at a position along a paper money transfer course where a paper money transferring force is not applied to a forward end of the paper money. A trouble of the paper money having the cut and the low rigidity occurs in significantly high probability. Therefore, the paper money having the cut and the low rigidity should be taken out of the automated teller machine 1.

Figure 2:
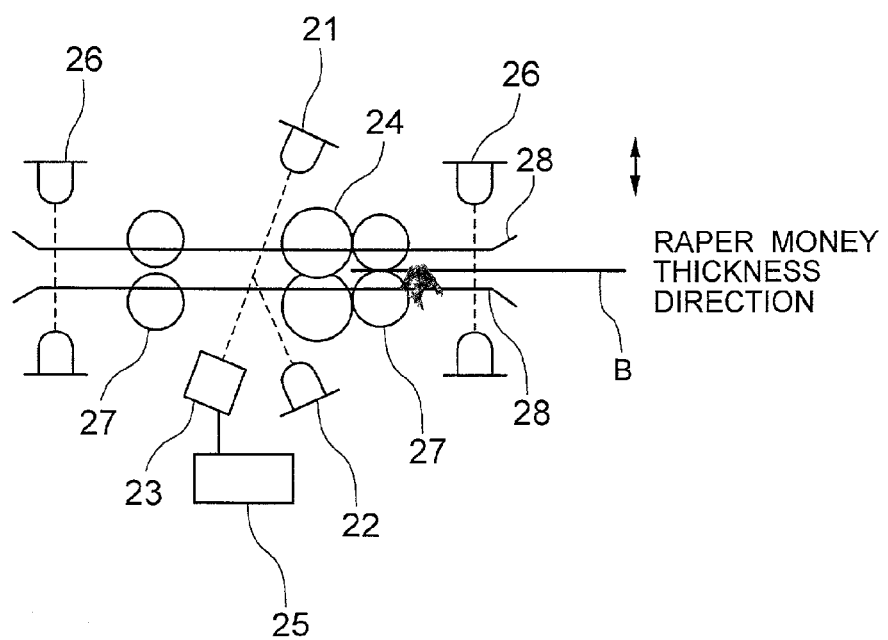
FIG. 2 is a schematic cross sectional view showing a paper money monitoring device of the invention.

A paper money judging device 20 as shown in FIG. 2 is arranged between the paper money gateway 4 and the container 8 as shown in FIG. 1.

The paper money judging device 20 has a first light beam emitter 21, a second light beam emitter 22, a light beam receiver 23, an urging device 24, a calculation device 25 and a paper money detector 26. The first light beam emitter 21 including, for example, LED faces to the light beam receiver 23 through a transferring coarse along which the paper money B is transferred. The second light beam emitter 22 including, for example, LED is juxtaposed with the light beam receiver 23 along the transferring coarse. The light beam receiver 23 including, for example, a line CCD forms an optical image of the paper money. The first light beam emitter 21, second light beam emitter 22 and light beam receiver 23 are used to detect or measure a condition of the paper money, and the urging device 24 deforms the paper money B. The calculation device 25 including at least a CPU and a memory device treats an optical information obtained by the first light beam emitter 21, second light beam emitter 22 and light beam receiver 23.

The urging device 24 may have rollers 24 whose rotational axes are apart from each other and whose outer peripheral diameters are equal to each other. The paper money detector 26 includes, for example, a pair of photodiode and phototransistor for detecting that the paper money exist on an optical axis of the pair of photo-diode and phototransistor.

A pair of the light beam receivers 23 may be used to correspond to respectively the first light beam emitter 21 and second light beam emitter 22. When the single light beam receiver 23 is used for both the first light beam emitter 21 and second light beam emitter 22, the first light beam emitter 21 and second light beam emitter 22 alternately emit the light beam so that the first light beam emitter 21 emits the light beam when the second light beam emitter 22 does not emit the light beam, and the first light beam emitter 21 does not emit the light beam when the second light beam emitter 22 emits the light beam. The light beam receiver 23 may be used for the paper money validator 6 so that the paper money judging device 20 is incorporated in the paper money validator 6.

The paper money detector 26 may be arranged close to an optical axis between the first light beam emitter 21 and light beam receiver 23. The transfer path 5 includes transfer rollers 27 and transfer guides 28. At least one of the transfer rollers 27 for urging the paper money B forward may be replaced by a flat belt.

Figure 3:
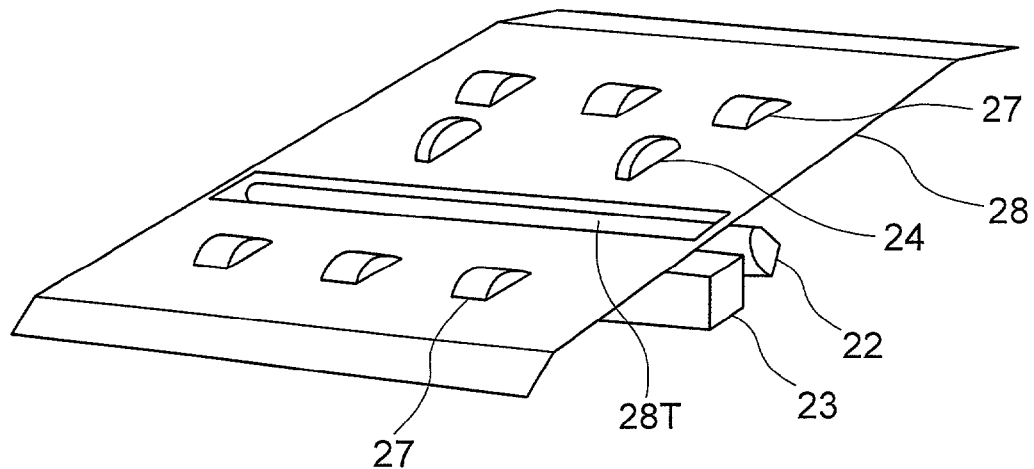
FIG. 3 is an oblique projection view showing a part of the paper money monitoring device of the invention.

As shown in FIG. 3, the transfer guides 28 have transparent guide members 28T through which the light beam passes between the first light beam emitter 21 and the light beam receiver 23 and the second light beam emitter 22 and the light beam receiver 23.

A timing at which the paper money B transferred by the transfer rollers 27 along the transfer guides 28 reaches the optical axis between the first light beam emitter 21 and light beam receiver 23 is calculated from a timing at which the paper money B transferred by the transfer rollers 27 along the transfer guides 28 reaches the paper money detector 26 and a time period in which the forward end of the paper money proceeds from the paper money detector 26 and to the optical axis between the first light beam emitter 21 and light beam receiver 23 with a constant velocity.

Figure 4:
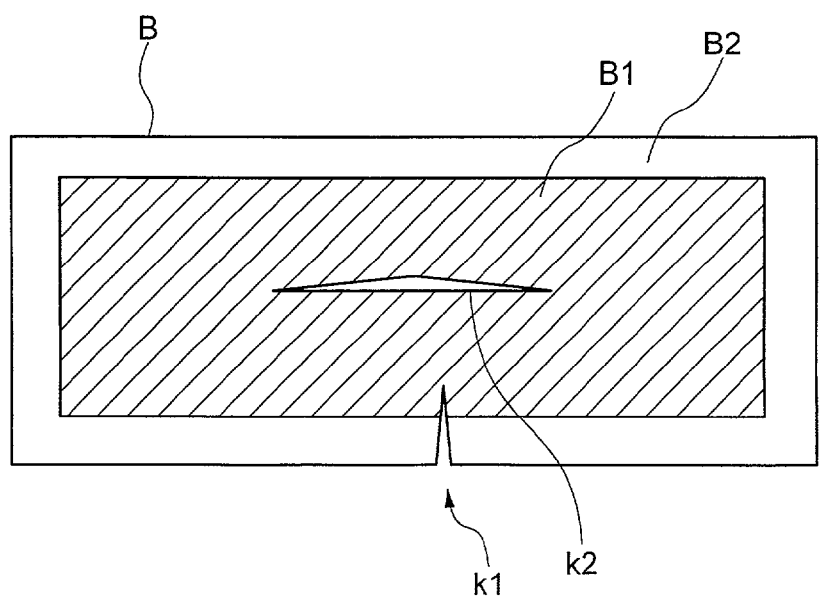
FIG. 4 is a schematic view showing cuts formed in a paper money.

As shown in FIG. 4, the cut may be a cut k1 extending from an outer peripheral edge of the paper money or a cut k2 prevented from extending from the outer peripheral edge of the paper money. When a width of the cut k1 or k2 is large, the light beam proceeds from the first light beam emitter 21 to the light beam receiver 23. Therefore, when an intensity of the light beam or a total amount of luminous flux of the light beam received by the light beam receiver 23 is more than a predetermined degree, the calculation device 25 judges that the paper money has the cut, that is, when the intensity of the light beam or the total amount of luminous flux of the light beam received by the light beam receiver 23 is excessively large, the calculation device 25 judges that the paper money has the cut. The predetermined degree is larger than the intensity of the light beam or the total amount of luminous flux of the light beam from the paper money without cut received by the light beam receiver 23.

Figure 5:
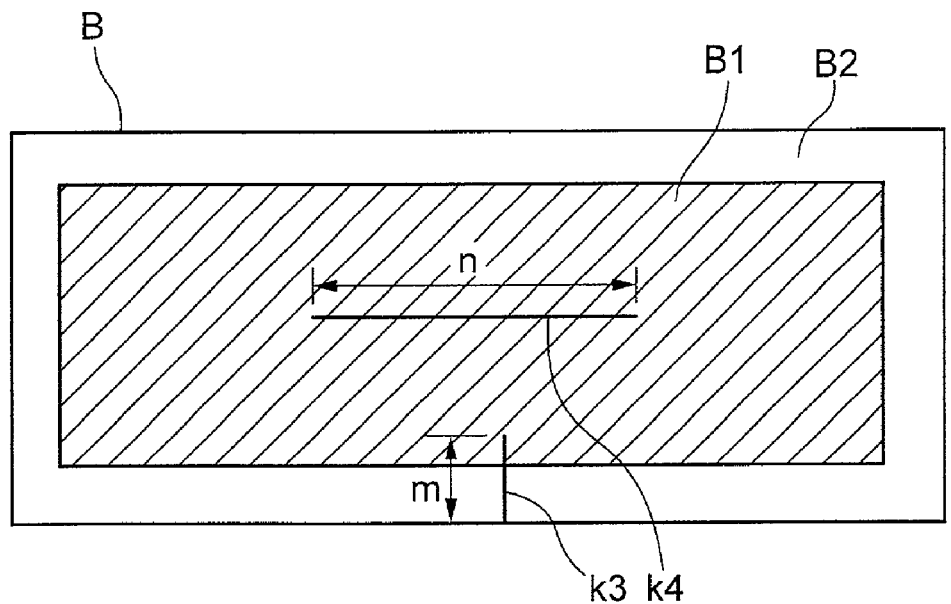
FIG. 5 is a schematic view showing cuts formed in a paper money.

Actually, in many cases, the width of the cut k1 or k2 is small as shown in FIG. 5. Therefore, in order to correctly judge whether or not the that the paper money has the cut, it is preferable for the width of the cut k1 or k2 to be expanded by the urging device 24 at at least an upstream side of the optical axis between the first light beam emitter 21 and light beam receiver 23.

Figure 6:
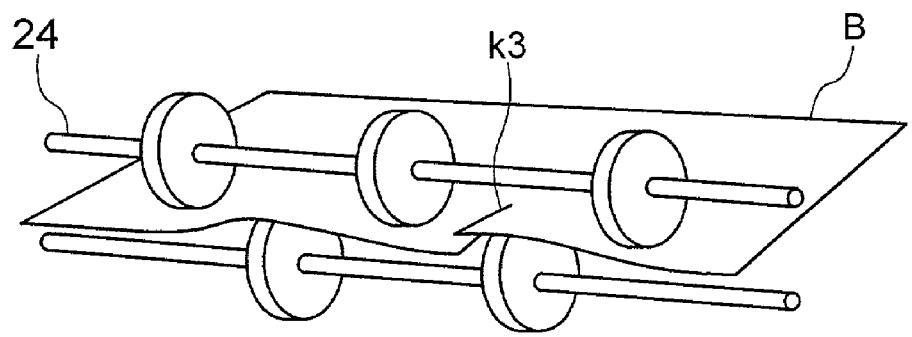
FIG. 6 is an oblique projection view showing a paper money deforming device of the invention.
Figure 7:
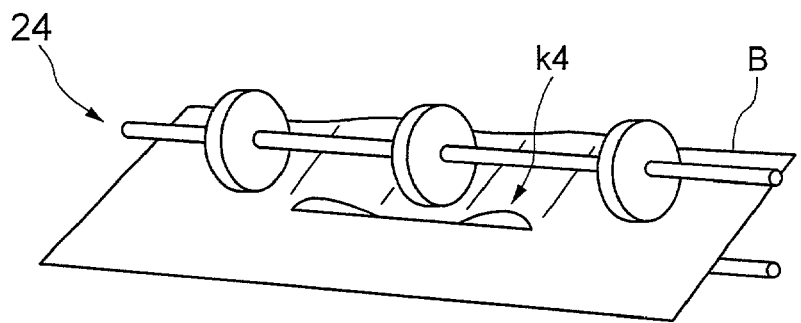
FIG. 7 is an oblique projection view showing another paper money deforming device of the invention.

As shown in FIGS. 6 and 7, since the urging device 24 has the rollers 24 whose rotational axes are apart from each other and whose outer peripheral diameters are equal to each other, the paper money is deformed in a paper money thickness direction, so that the width of the cut k3 and/or k4 is expanded to pass a large amount of the light beam through the cut k3 and/or k4. If the light beam cannot proceed through the cut k3 and/or k4 although the width of the cut k3 and/or k4 is expanded, a periphery of the cut k3 and/or k4 is made more bright by the reflected light beam. A reference value of a total amount of luminous flux, a maximum luminous intensity, an average luminous intensity of the light beam or the like received by the light beam receiver 23 on the basis of which value whether or not the cut exists in the paper money is judged is determined on the basis of a total amount of luminous flux, a maximum luminous intensity, an average luminous intensity of the light beam or the like received by the light beam receiver 23 when the paper money has no cut.

A length m or n of the cut is calculated by the calculation device 25 from the image formed by the light beam receiver 23, so that the paper money having the cut of length m or n more than a predetermined threshold value is judged to be inappropriate. The judgement may be performed on the basis of a maximum distance between an end of the cut and the forward or backward edge of the paper money, or on the basis of an area defined by the cut measured by CCD.

Figure 8:
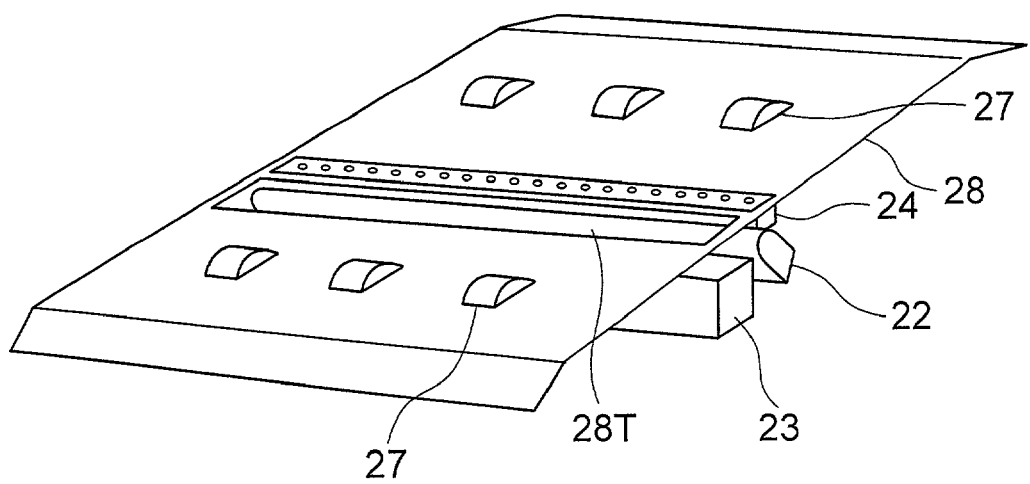
FIG. 8 is an oblique projection view showing a part of another paper money monitoring device of the invention.

As shown in FIG. 8, a width of a cut k4 may be expanded by a combination of a pressing roller and an pressurized air directed upward, or by a comb shaped member for generating a pair of forces away from each other in at least one of directions perpendicular to the paper money thickness direction and perpendicular to each other while directions of the forces are opposite to each other, so that the width of the cut is expanded in the paper money thickness direction.

Figure 9:
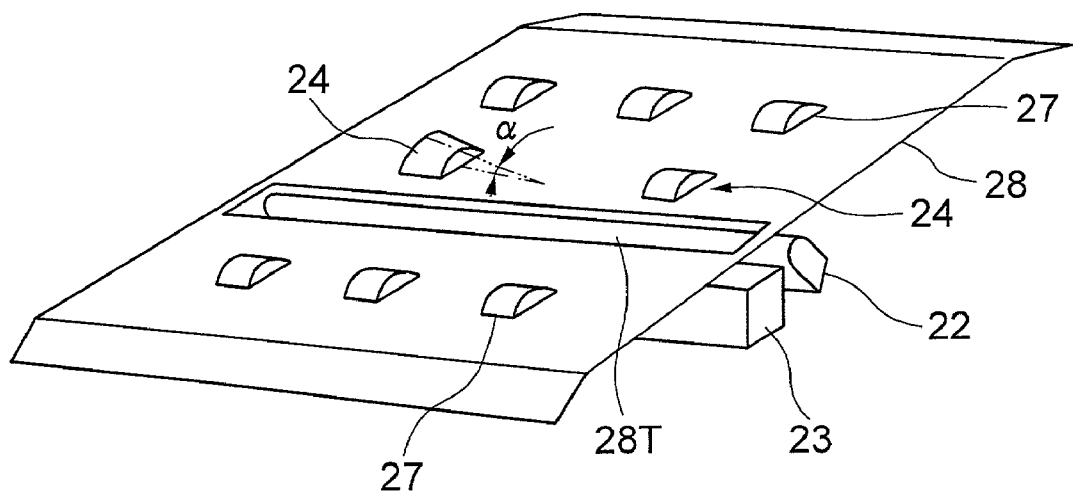
FIG. 9 is an oblique projection view showing a part of another paper money monitoring device of the invention.
Figure 10:
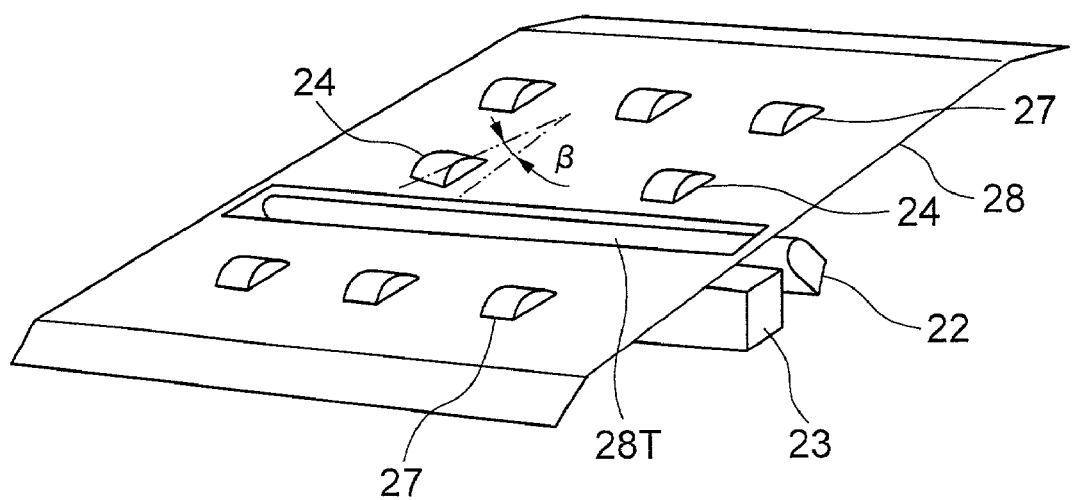
FIG. 10 is an oblique projection view showing a part of another paper money monitoring device of the invention.

As shown in FIGS. 9 and 10, for expanding the width of the cut, it is also preferable for the width of the cut to be expanded in the direction perpendicular to the paper money thickness direction.

As shown in FIG. 9, the urging device 24 has tapered rollers of frustum-cone with a tapered angle θ with respect to the rotational axis thereof, and tapered surfaces of the tapered rollers face to each other in the rotational axis, so that a part of the paper money is compressed in the direction perpendicular to the paper money thickness direction and the paper money proceeding direction to expand the width of the cut because of a difference in tangential velocity between a relatively radially inner surface and a relatively radially outer surface on each of the tapered surfaces.

As shown in FIG. 10, the urging device 24 has cylindrical rollers whose rotational axes are inclined with respect to the direction perpendicular to the paper money thickness direction and the paper money proceeding direction by an angle β, so that a tension is applied to a part of the paper money in the direction perpendicular to the paper money thickness direction and the paper money proceeding direction to expand the width of the cut. The existence of the cut may be detected by an acoustic sensor.

Figure 11:
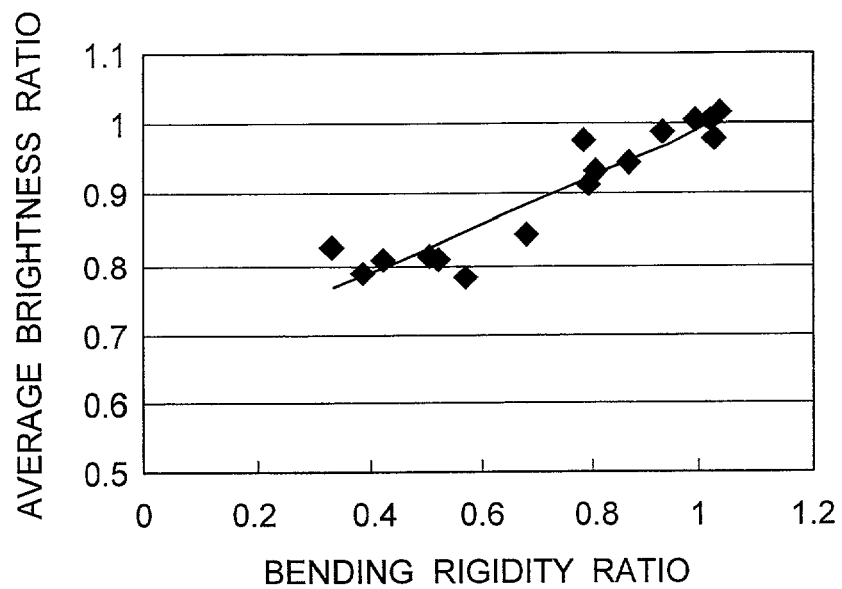
FIG. 11 is a diagram showing a relationship between an anti-bending rigidity ratio (between used paper money and new paper money) and an average luminance brightness ratio (between used paper money and new paper money).

As shown in FIG. 11, because a luminous degree (an average luminous intensity or luminous brightness, a maximum luminous intensity or a total amount of luminous flux) in the light beam from the paper money and a rigidity of the paper money decrease in accordance with a used term in the market, a relationship between a ratio in luminous degree between a new or unused paper money and each of used paper moneys of respective used terms and a ratio in anti-bending rigidity between the new or unused paper money and the each of used paper moneys of respective used terms can be formulated.

Figure 12:
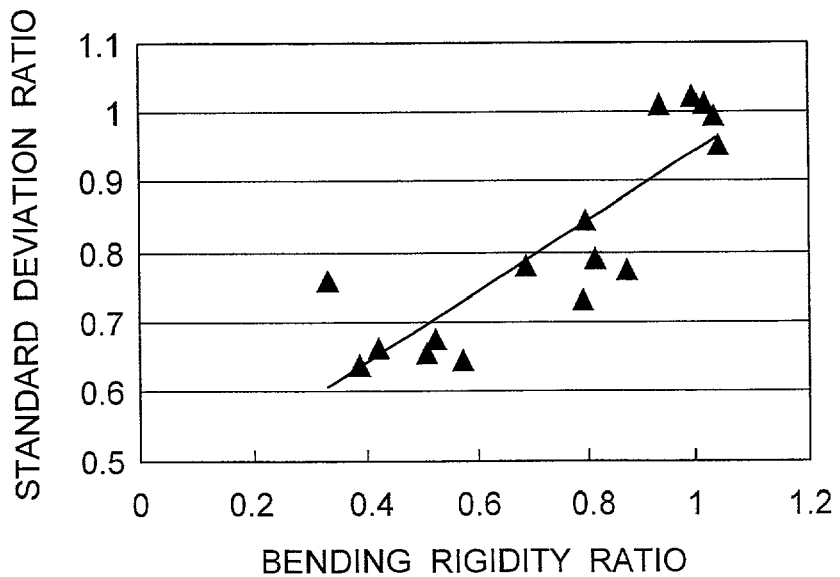
FIG. 12 is a diagram showing a relationship between an anti-bending rigidity ratio (between used paper money and new paper money) and a standard deviation of luminance brightness ratio (between used paper money and new paper money).

As shown in FIG. 12, because a contrast (a standard deviation of luminous intensity and a difference between a maximum luminous intensity and a minimum luminous intensity) in the light beam from the paper money and a rigidity of the paper money decrease in accordance with a used term in the market, a relationship between a ratio in contrast between a new or unused paper money and each of used paper moneys of respective used terms and a ratio in anti-bending rigidity between the new or unused paper money and the each of used paper moneys of respective used terms can be formulated.

Therefore, when the luminous degree and/or contrast in the light beam from the paper money is less than a predetermined threshold value, the paper money is judged to be of low-rigidity.

In FIGS. 11 and 12, the luminous degree and contrast are measured over a surface including a printed area B1 and a non-printed area B2 as shown in FIGS. 4 and 5. Alternately, the luminous degree and contrast may be measured over only the non-printed area B2, as in FIGS. 13 and 14.

Figure 13:
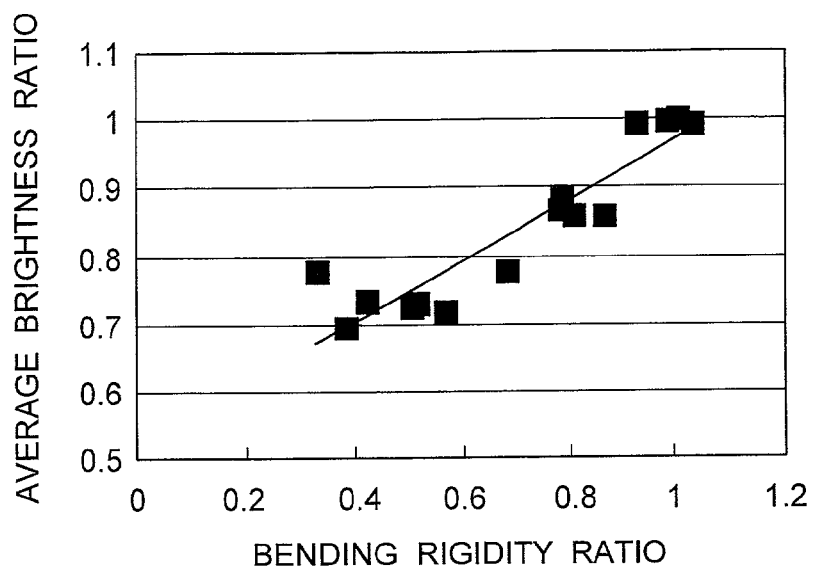
FIG. 13 is a diagram showing a relationship between an anti-bending rigidity ratio (between used paper money and new paper money) and an average luminance brightness ratio (between used paper money and new paper money).
Figure 14:
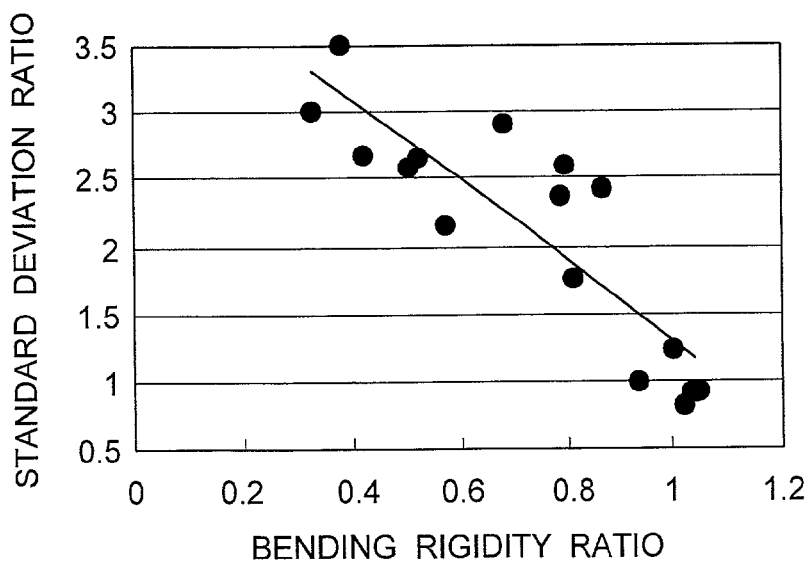
FIG. 14 is a diagram showing a relationship between an anti-bending rigidity ratio (between used paper money and new paper money) and a standard deviation of luminance brightness ratio (between used paper money and new paper money).

As shown in FIG. 13, the relationship between the ratio in luminous degree between the new or unused paper money and each of used paper moneys of respective used terms and the ratio in anti-bending rigidity between the new or unused paper money and the each of used paper moneys of respective used terms can be formulated. As shown in FIG. 14, the relationship between the ratio in contrast between the new or unused paper money and each of used paper moneys of respective used terms and the ratio in anti-bending rigidity between the new or unused paper money and the each of used paper moneys of respective used terms can be formulated.

Therefore, when the contrast in the light beam from the non-printed area B2 of the paper money is more than a predetermined threshold value and/or the luminous degree in the light beam from the non-printed area B2 of the paper money is less than a predetermined threshold value, the paper money is judged to be of low-rigidity, when the luminous degree and contrast are measured over only the non-printed area B2.

When the cut in the paper money and/or the low-rigidity of the paper money more than an acceptable value is detected, the paper money is returned to the paper money gateway 4 so that the inappropriate paper money is prevented from being introduced into the automated teller machine 1.

The average luminous intensity or luminous brightness and the total amount of luminous flux can be measured by luminous flux sensors (for example, photoconductive elements) other than CCD.

Figure 15:
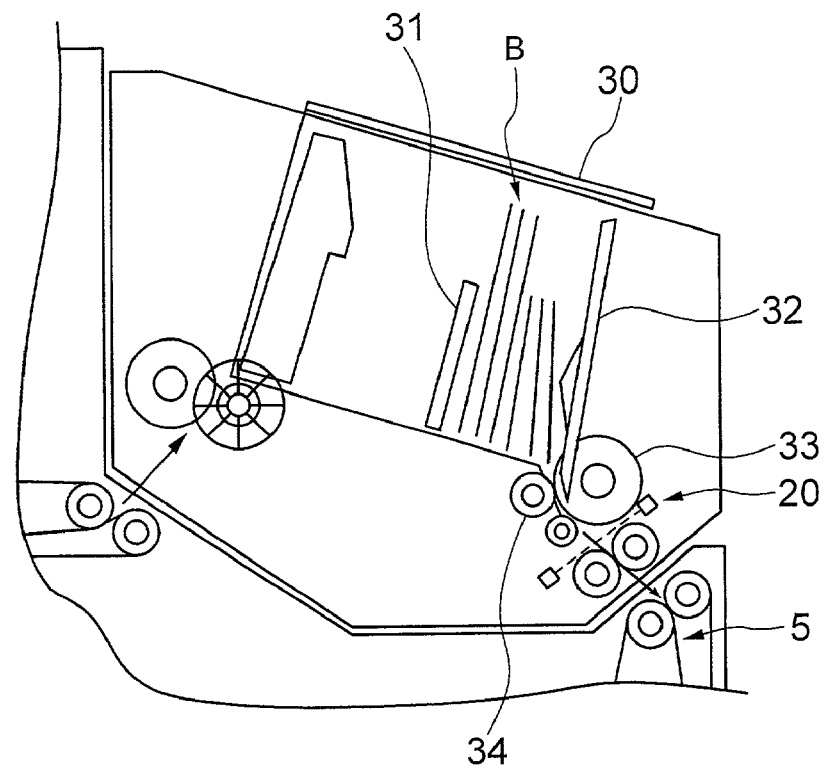
FIG. 15 is a schematic cross sectional view showing a paper money gateway.

As shown in FIG. 15, it is preferable for the paper money judging device 20 to be arranged close to the paper money gateway 4 so that the inappropriate paper money is returned to the paper money gateway 4 without proceeding to the transfer path 5.

A shutter 30 is opened to allow the paper money(s) B to be inserted into the paper money gateway 4. After the paper money(s) B is inserted into the paper money gateway 4, the shutter 30 is closed and the paper money(s) B is pressed between a pressing plate 31 and a guide plate 32. The paper money contacting the guide plate 32 contacts also a feeding roller 33 having a high-friction elastomer outer peripheral surface so that the paper money is fed by a rotation of the feeding roller 33. A stop roller 34 having a high-friction elastomer outer peripheral surface is rotatable in a single direction for urging the paper money toward the paper money gateway 4, so that only the paper money contacting the guide plate 32 and the feeding roller 33 is fed from the paper money gateway 4 to the transfer path 5 and another paper money not-contacting the guide plate 32 and the feeding roller 33 is prevented from being fed from the paper money gateway 4 to the transfer path 5.

While the paper money is fed by the feeding roller 33, the existence of the cut in the paper money and the low rigidity of the paper money is judged. The feeding roller 33 and the stop roller 34 may deform the paper money to expand the width of the cut. When the not-acceptable existence of the cut in the paper money and/or the not-acceptable low rigidity of the paper money is detected, a rotation of the feeding roller 33 is reversed to return the inappropriate paper money to the paper money gateway 4. The inappropriate paper money returned to the paper money gateway 4 is kept to contact the guide plate 32 so that the inappropriate paper money is easily removed by an user.

It is preferable for determining suitably the predetermined value as the basis on judging the existence of the cut in the paper money and the low rigidity of the paper money during a minimum time period that a kind of the paper money is detected in the paper money judging device 20, because the predetermined value varies in accordance with the kind of the paper money. The kind of the paper money can be measured by the CCD for measuring a printed pattern of the paper money or a color sensor (a photo-sensor with a color filter) for measuring a color of the paper money.

Figure 16:
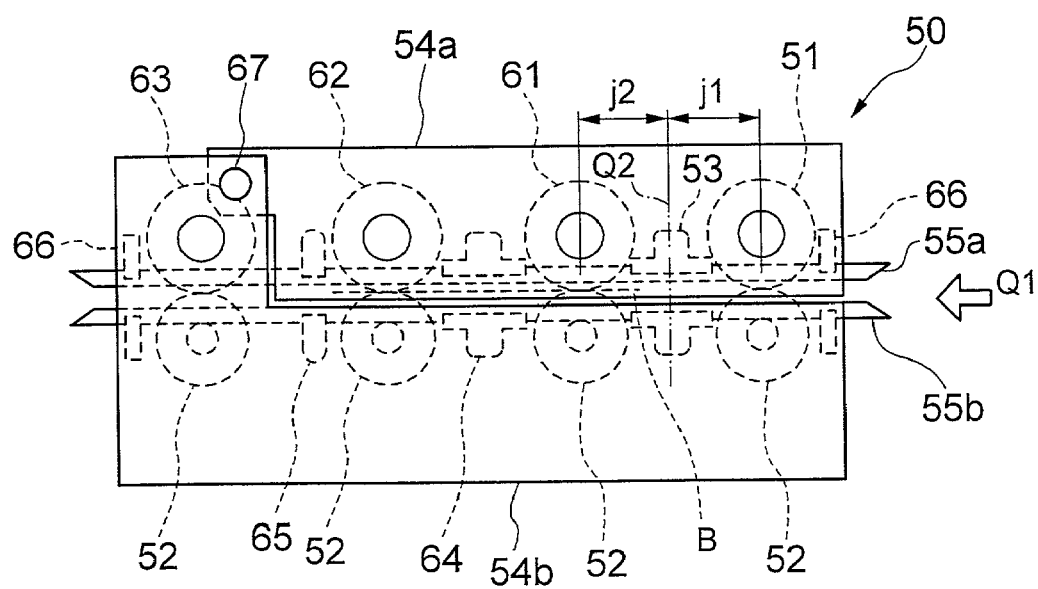
FIG. 16 is a schematic cross sectional view showing another paper money monitoring device of the invention.

As shown in FIG. 16, in another paper money judging device 50, the paper money B is transferred between transfer guides 55a and 55b. A driven shaft 52 is pressed against each of an urging shaft 51 and transferring shafts 61-63 rotated by a motor (not shown) so that the paper money B clamped between the driven shaft 52 and each of the urging shaft 51 and transferring shafts 61-63 is transferred by the transferring shafts 61-63 while a tension is applied to the paper money in a paper money width direction perpendicular to the paper money thickness direction and the paper money feeding transferring direction to expand the cut in the paper money.

An image input device 53 includes, for example, a LED and a CCD line sensor so that a light beam emitted by the LED and reflected by the paper money and/or a light beam emitted by the LED and passing through the paper money is received by the CCD line sensor to input an image of the paper money. An optical axis Q2 along which the paper money is scanned by the CCD line sensor is distant from the urging shaft 51 by a length j1, and is distant from the transferring shaft 61 by a length j2. It is preferable for securely detecting the cut in the paper money that the length j1 is as small as possible.

The driven shaft 52 and the transfer guide 55b are supported on a frame 54b, and the urging shaft 51, the transferring shafts 61-63 and the transfer guides 55a and 55b are supported on a frame 54a pivotally connected through a pivot 67 to the frame 54b, so that the frame 54a is swung upward with respect to the frame 54b to remove a contaminant or jam from the paper money judging device 50. A paper money detector 66, a magnetic sensor 64 and a paper money thickness sensor 65 are arranged adjacent to the transfer guides 55a and 55b.

Figure 17:
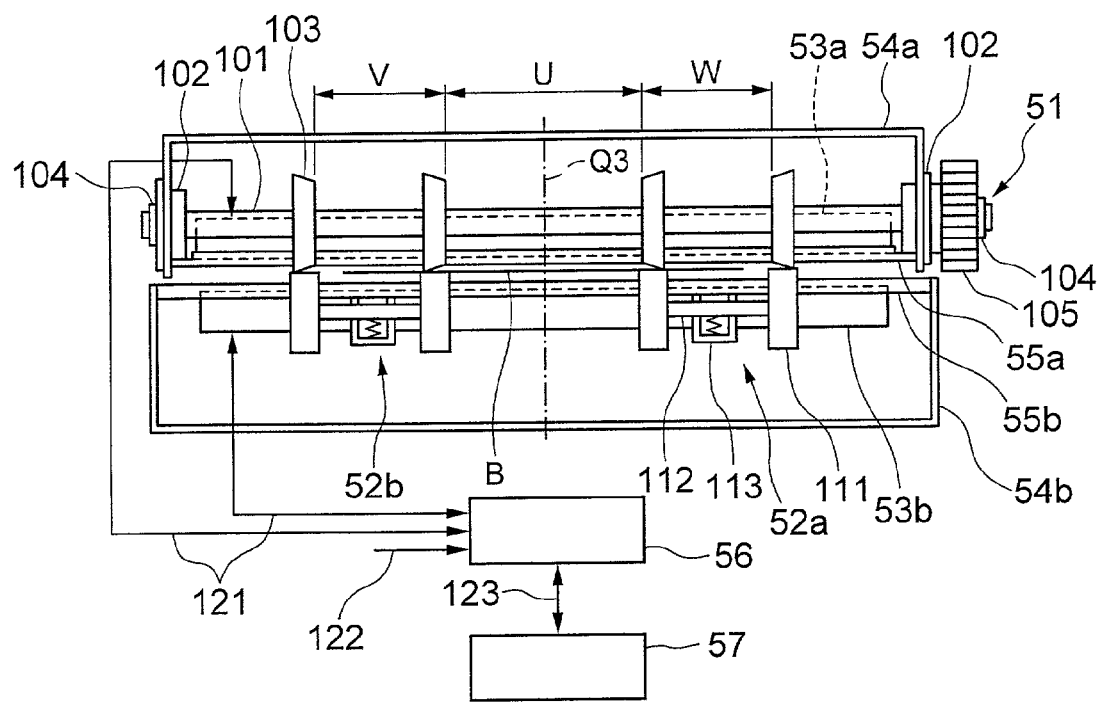
FIG. 17 is a view showing another paper money deforming device of the invention.

FIG. 17 is a view showing the paper money judging device 50 as seen from a direction of arrow Q1 in FIG. 16. The urging shaft 51 has a shaft 101, rotary bearings 102, tapered rollers 103, stop rings 104 and a gear 105. The gear 105 is driven by the motor (not shown). The tapered rollers 103 fixed to the shaft 101 have respective elastomer outer peripheral surfaces tapered toward a transfer central line Q3. The rotary bearings 102 support the shaft 101 on the frame 54a in a rotatable manner, and stop rings 104 prevent an axial movement of the shaft 101. The driven shaft 52 has driven rollers 111, a shaft 112 and springs 113. The driven rollers 111 fixed to the shaft 112 is prevented by a transfer guide 55b from moving axially, and are pressed against the tapered rollers 103 by the springs 112.

A judge control device 56 is electrically connected to the image input device 53 through a connection line 121, and to the paper money detector 66, magnetic sensor 64 and paper money thickness sensor 65 through a connection line 122, so that a timing of image input and a detection of the cut in the paper money from the input image is controlled.

A mechanical control device 57 has a mechanical movement in the automated teller machine 1, for example, switching the gate 7. The mechanical control device 57 is electrically connected to the judge control device 56 through a connection line 123. When the paper money B is taken into the automated teller machine 1 along a normal transfer coarse, the paper money is transferred from the gate way 4 through the transfer path 5 to be contained temporarily by the container 8. When the cut is found in the paper money by the paper money judging device 50, the gate 7 is switched to return the paper money to the gate way 4. When the cut is found in the paper money by the paper money judging device 50 while the paper money is transferred from the container 8 to the container 9, the gate 7 is switched to transfer the paper money to the reject container 10.

Figure 18:
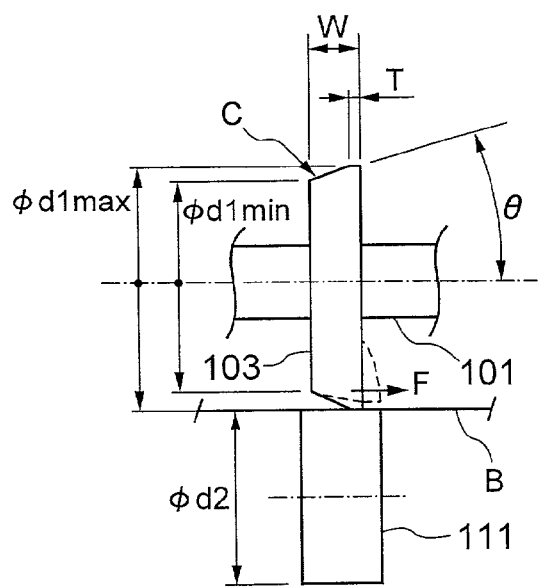
FIG. 18 is an enlarged view showing a pair of rollers of the paper money deforming device of the invention.

As shown in FIG. 18, the tapered roller 103 has a cylindrical outer peripheral surface of width T and a tapered outer peripheral surface C. The driven roller 111 has a cylindrical outer peripheral surface. In this embodiment, $\phi d1$ max is about 20 mm, $\phi d2$ is about 16 mm, W is 5 mm, T is 0.5 mm, and $\theta$ is 15-45 degrees.

Figure 19:
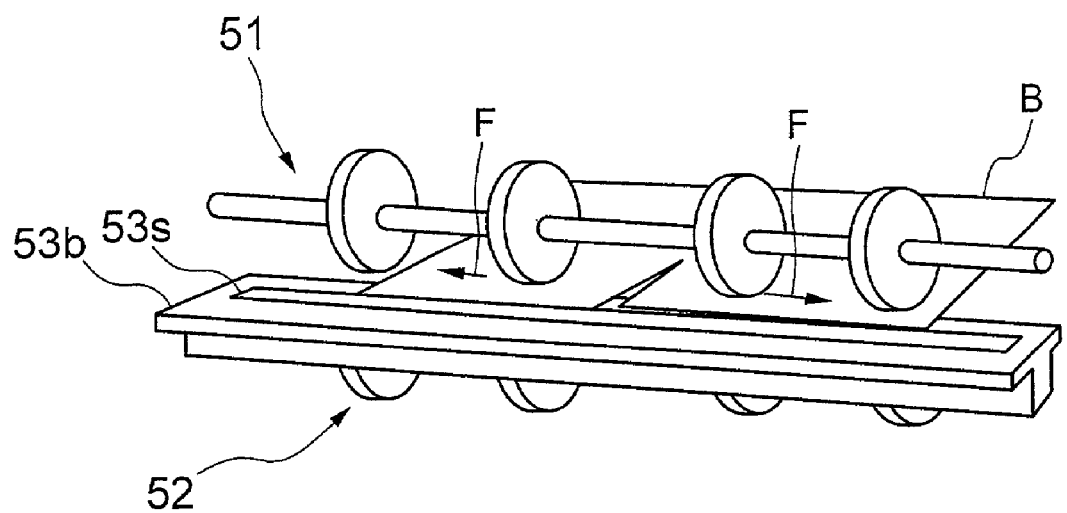
FIG. 19 is an oblique projection view showing the paper money monitoring device and the paper money deforming device.

When the paper money clamped between the tapered roller 103 and the driven roller 111 is transferred by rotationally driving the tapered roller 103, the tapered roller 103 is deformed axially in a direction from a small diameter toward a large diameter in taper as shown by dot-line in FIG. 18, so that a force F is generated to urge the paper money in the direction, as shown in FIG. 19. A transparent window 53s is arranged to input the image of the paper money through the transparent window 53s into the CCD line sensor.

Figure 20:
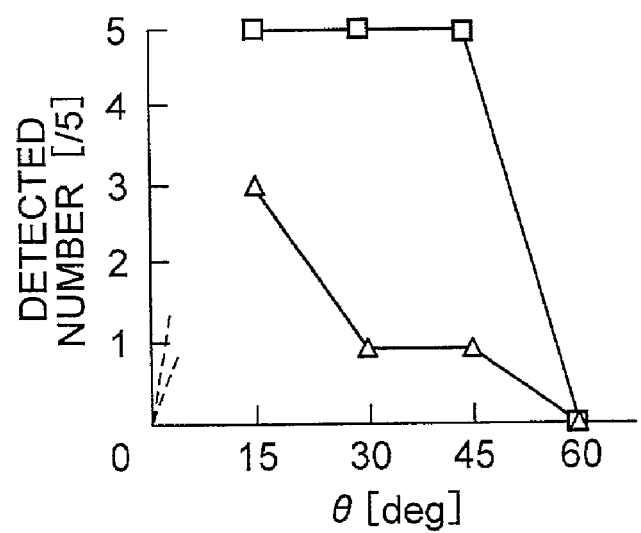
FIG. 20 is a diagram showing a relationship between a taper angle of roller of the paper money deforming device and a number of money papers having cut detected by the paper money monitoring device.

At least a part of the light beam emitted by a LED 53a passes through the cut whose width is expanded by the force F to be received by a CCD line sensor 53b so that the cut is measured or detected from the at least a part of the light beam detected by the CCD line sensor 53b, as shown in FIG. 20. It is preferable forθ to be more than zero and less than 60 degrees, particularly to be about 15 degrees.

Figure 21:
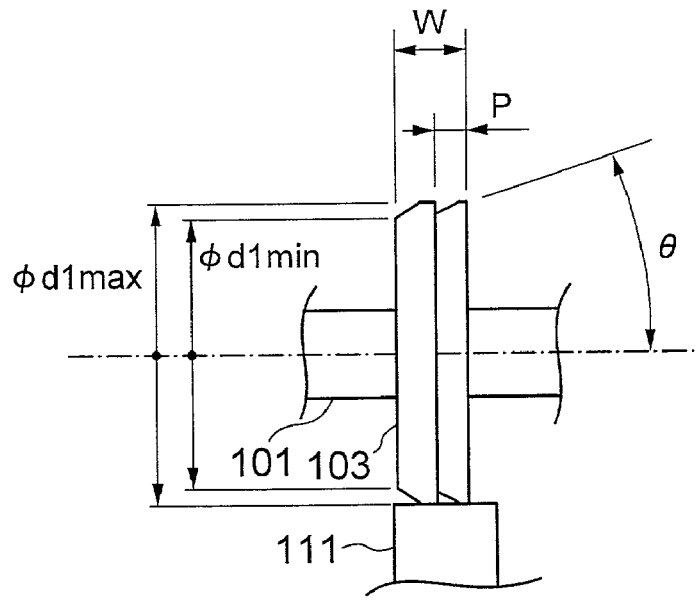
FIG. 21 is an enlarged view showing a twin-tapered-surfaces roller of the paper money deforming device of the invention.
Figure 22:
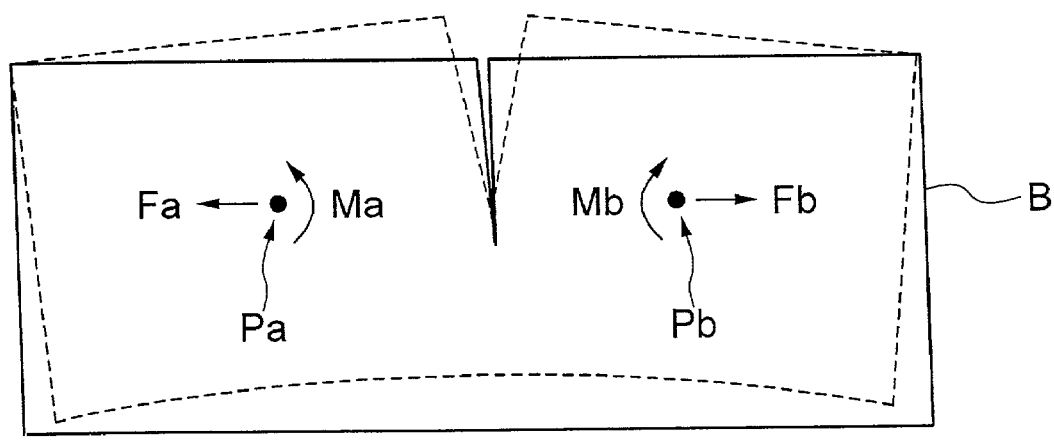
FIG. 22 is a schematic view showing a force applied to the paper money by the paper money deforming device.

As shown in FIG. 21, the tapered roller 103 may have a pair of the tapered outer peripheral surfaces. FIG. 22 shows paper money clamping points Pa and Pb at which the paper money is clamped between the tapered rollers of single tapered surface and the driven rollers, tensions Fa and Fb applied to the paper money by the tapered rollers of single tapered surface, and rotational moments Ma and Mb applied to the paper money by the tapered rollers of single tapered surface, each of which rotational moments is generated by a difference in paper money feeding velocity on the tapered roller.

Figure 23:
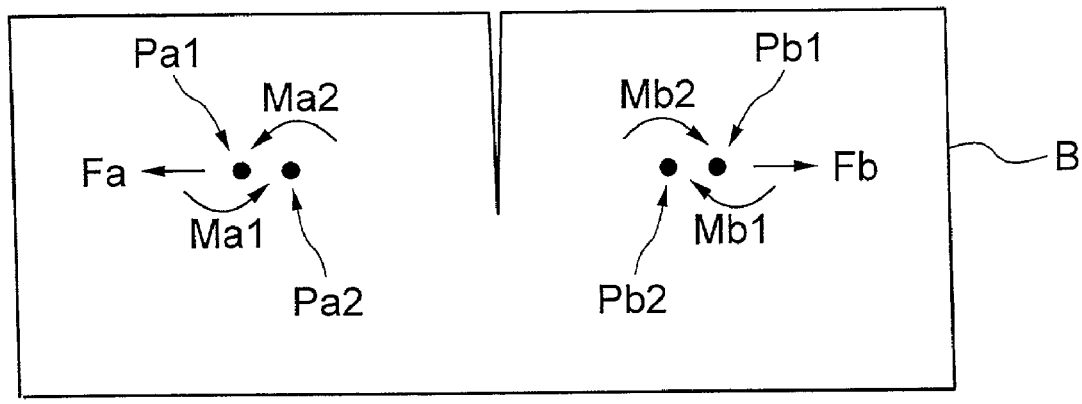
FIG. 23 is a schematic view showing another force applied to the paper money by the paper money deforming device.
Figure 24:
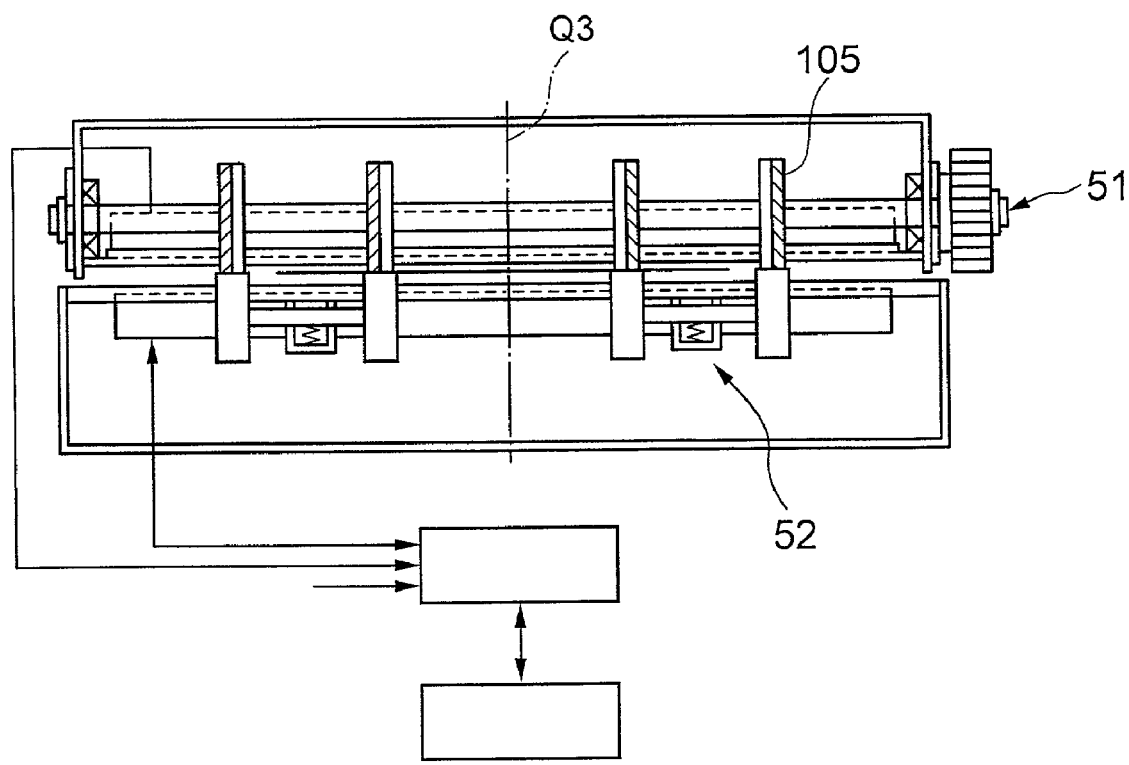
FIG. 24 is a view showing another paper money deforming device of the invention.

When the tapered roller has the pair of the tapered outer peripheral surfaces, paper money clamping points Pa1, pa2, Pb1 and Pb2 at which the paper money is clamped between the pairs of tapered surfaces of the tapered rollers and the driven rollers, tensions Fa and Fb applied to the paper money by the tapered rollers, and rotational moments Ma1, Ma2, Mb1 and Mb2 applied to the paper money by the pairs of tapered surfaces of the tapered rollers, are formed as shown in FIG. 23. The rotational moments Ma1 and Ma2 cancel each other, and the rotational moments Mb1 and Mb2 cancel each other. Therefore, only the tensions Fa and Fb are applied to the paper money.

Figure 25:
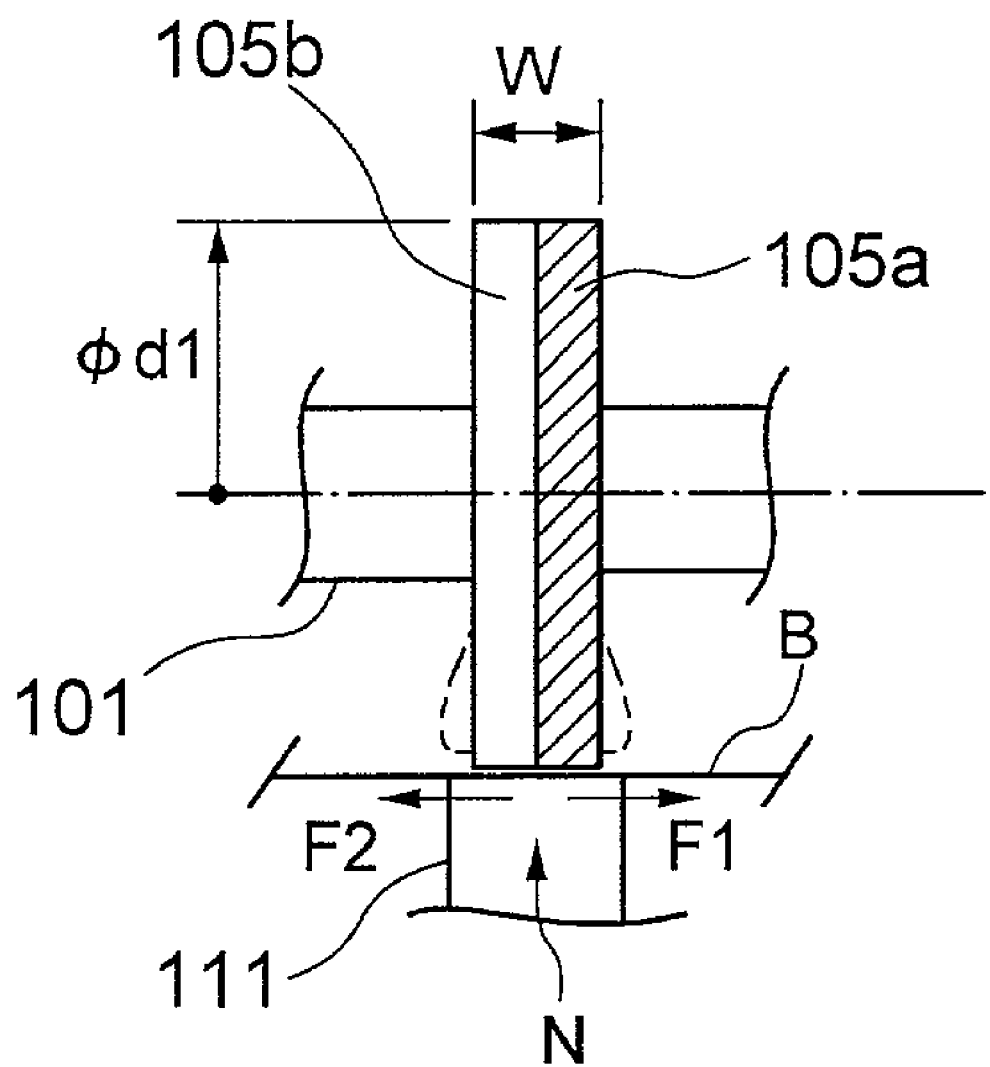
FIG. 25 is an enlarged view showing another roller of the paper money deforming device of the invention.

As shown in FIG. 25, the tapered roller 103 may be replaced by a friction roller 105 including a high-frictional-coefficient outer peripheral elastomer surface 105a and a low high-frictional-coefficient outer peripheral elastomer surface 105b including a fluorocarbon resin or the like. When a driven roller is pressed against the friction roller 105 by a force N, the outer peripheral elastomer surfaces 105a and 105b project axially as shown by a dot-line in FIG. 25. Since a frictional-coefficient of the outer peripheral elastomer surface 105a is larger than that of the outer peripheral elastomer surface 105b, the paper money is urged from the outer peripheral elastomer surface 105b toward the outer peripheral elastomer surface 105a so that the tension is applied to the paper money to expand the width of the cut when the outer peripheral elastomer surface 105b is arranged between the transfer central line Q3 and the outer peripheral elastomer surface 105a.

The transferring shaft 61 may be replaced by the urging shaft 51 so that the cut is expanded for a longer time period and at a longer length thereof.

What is claimed is:

1. An automated teller machine for handling paper money, comprising,
    a paper money path for transferring the paper money along a predetermined direction,
    a detector for measuring a condition of the paper money, comprising a light beam emitter for emitting a light beam toward the paper money, and a light beam receiver for receiving at least one of a reflected light beam of the emitted light beam reflected by the paper money and a passed light beam of the emitted light beam passing through the paper money;
    a paper money deforming device for applying to the paper money at least one of a tension in at least one of a first direction parallel to the predetermined direction and perpendicular to a paper money thickness direction and a second direction perpendicular to the predetermined direction and the paper money thickness direction, a compression force in at least one of the first and second directions, and a pair of forces away from each other in at least one of the first and second directions while directions of the forces are opposite to each other, so that at least one of a width of a clearance in the paper money extending from an edge of the paper money and a width of a clearance in the paper money prevented from extending from the edge of the paper money is expanded by the paper money deforming device;
    wherein the paper money deforming device includes at least one roller rotatable on an axis parallel to the second direction and a rotatable supplemental roller, the roller includes a tapered surface adapted to contact the money paper in the second direction and to be pressed against a peripheral surface of the supplemental roller, and the tapered surface includes elastomer.

2. An automated teller machine according to claim 1, wherein the at least one of the tension, the compression force and the pair of forces is applied to the paper money at at least one of upstream and downstream sides of the detector in the predetermined direction.

3. An automated teller machine according to claim 1, wherein the roller includes a pair of the tapered surfaces, and the tapered surfaces are directed to the same direction.

4. An automated teller machine according to claim 1, wherein the detector detects an existence of at least one of a clearance in the paper money extending from an edge of the paper money and a clearance in the paper money prevented from extending from the edge of the paper money as the condition of the paper money, when a luminous degree of the at least one of the light beam reflected by the paper money and the light beam passing through the paper money detected by the light beam receiver is more than a predetermined value.

5. An automated teller machine according to claim 1, wherein the light beam receiver detects at least one of a luminous degree of the at least one of the light beam reflected by the paper money and the light beam passing through the paper money received by the light beam receiver, and a contrast in the at least one of the light beam reflected by the paper money and the light beam passing through the paper money received by the light beam receiver so that a rigidity of the paper money as the condition of the paper money is estimated on the basis of the at least one of the detected luminous degree and the detected contrast.

6. An automated teller machine according to claim 4, wherein the luminous degree is determined on the basis of at least one of an average luminous intensity, a maximum luminous intensity and a total amount of luminous flux in the at least one of the light beam reflected by the paper money and the light beam passing through the paper money, received by the light beam receiver.

7. An automated teller machine according to claim 5, wherein the luminous degree is determined on the basis of at least one of an average luminous intensity, a maximum luminous intensity and a total amount of luminous flux in the at least one of the light beam reflected by the paper money and the light beam passing through the paper money, received by the light beam receiver.

8. An automated teller machine according to claim 5, wherein the contrast is determined on the basis of at least one of a standard deviation of luminous intensity and a difference between a maximum luminous intensity and a minimum luminous intensity in the at least one of the light beam reflected by the paper money and the light beam passing through the paper money, received by the light beam receiver.

9. An automated teller machine according to claim 1, wherein the light beam receiver detects at least one of a luminous degree of the at least one of the light beam reflected by the paper money and the light beam passing through the paper money received by the light beam receiver, and a contrast in the at least one of the light beam reflected by the paper money and the light beam passing through the paper money received by the light beam receiver so that a rigidity of the paper money as the condition of the paper money is estimated on the basis of the at least one of the detected luminous degree and the detected contrast, when the luminous degree of the at least one of the light beam reflected by the paper money and the light beam passing through the paper money detected by the light beam receiver is not more than a predetermined value.

10. An automated teller machine according to claim 9, wherein the luminous degree is determined on the basis of at least one of an average luminous intensity, a maximum luminous intensity and a total amount of luminous flux in the at least one of the light beam reflected by the paper money and the light beam passing through the paper money, received by the light beam receiver.

11. An automated teller machine according to claim 9, wherein the contrast is determined on the basis of at least one of a standard deviation of luminous intensity and a difference between a maximum luminous intensity and a minimum luminous intensity in the at least one of the light beam reflected by the paper money and the light beam passing through the paper money, received by the light beam receiver.

12. An automated teller machine according to claim 5, wherein the light beam receiver detects at least one of the luminous degree of the at least one of the light beam reflected by both non-printed area and printed area of the paper money and the light beam passing through the both non-printed area and printed area of the paper money received by the light beam receiver, and a contrast in the at least one of the light beam reflected by the both non-printed area and printed area of the paper money and the light beam passing through the both non-printed area and printed area of the paper money, received by the light beam receiver.

13. An automated teller machine according to claim 12, wherein the detector judges the rigidity of the paper money to be less than a predetermined rigidity when the at least one of the luminous degree and the contrast is less than a predetermined value.

14. An automated teller machine according to claim 5, wherein the light beam receiver detects at least one of the luminous degree of the at least one of the light beam reflected by a non-printed area of the paper money and the light beam passing through the non-printed area of the paper money received by the light beam receiver, and a contrast in the at least one of the light beam reflected by the non-printed area of the paper money and the light beam passing through the non-printed area of the paper money, received by the light beam receiver.

15. An automated teller machine according to claim 14, wherein the detector judges the rigidity of the paper money is less than a predetermined rigidity when the luminous degree is less than a predetermined value.

16. An automated teller machine according to claim 14, wherein the detector judges the rigidity of the paper money is less than a predetermined rigidity when the contrast is more than a predetermined value.

17. An automated teller machine for handling a paper money, comprising,
  a paper money path for transferring the paper money along a predetermined direction, and
  a detector for measuring a condition of the paper money, comprising a light beam emitter for emitting a light beam toward the paper money, and a light beam receiver for receiving at least one of the a reflected light beam of the emitted light beam reflected by the paper money and a passed light beam of the emitted light beam passing through the paper money;
  a paper money deforming device for applying to the paper money at least one of a tension in at least one of a first direction parallel to the predetermined direction and perpendicular to a paper money thickness direction and a second direction perpendicular to the predetermined direction and the paper money thickness direction, a compression force in at least one of the first and second directions, and a pair of forces away from each other in at least one of the first and second directions while directions of the forces are opposite to each other, so that at least one of a width of a clearance in the paper money extending from an edge of the paper money and a width of a clearance in the paper money prevented from extending from the edge of the paper money is expanded by the paper money deforming device;
  wherein the paper money deforming device includes at least one roller rotatable on an axis parallel to the second direction and a rotatable supplemental roller, the roller includes first and second peripheral surfaces adapted to contact the money paper in the second direction and to be pressed against a peripheral surface of the supplemental roller, frictional coefficients of the first and second surfaces with respect to the paper money are different from each other, and the first and second surfaces include elastomer.

* * * * *